(12) United States Patent
Vorganti et al.

(10) Patent No.: US 10,474,560 B2
(45) Date of Patent: Nov. 12, 2019

(54) METHOD AND A SYSTEM FOR GENERATION OF TEST AUTOMATION SCRIPTS IN REAL TIME

(71) Applicant: Wipro Limited, Bangalore (IN)

(72) Inventors: Surya Vorganti, Raipur (IN); Rajiv Kumar Agarwal, Banagalore (IN)

(73) Assignee: Wipro Limited, Bangalore (IN)

( * ) Notice: Subject to any disclaimer, the term of this patent is extended or adjusted under 35 U.S.C. 154(b) by 8 days.

(21) Appl. No.: 15/463,554

(22) Filed: Mar. 20, 2017

(65) Prior Publication Data

US 2018/0260310 A1    Sep. 13, 2018

(30) Foreign Application Priority Data

Mar. 13, 2017    (IN) .............................. 201741008649

(51) Int. Cl.
    *G06F 11/36*    (2006.01)
(52) U.S. Cl.
    CPC ................. *G06F 11/3684* (2013.01)
(58) Field of Classification Search
    CPC ........... G06F 8/38; G06F 8/36; G06F 11/3684
    See application file for complete search history.

(56) References Cited

U.S. PATENT DOCUMENTS

| | | | |
|---|---|---|---|
| 8,365,147 B2 | 1/2013 | Grechanik et al. | |
| 8,667,467 B2 | 3/2014 | Dubey et al. | |
| 2003/0202012 A1* | 10/2003 | Kemp | G06F 8/71 715/762 |
| 2009/0217309 A1* | 8/2009 | Grechanik | G06F 8/38 719/328 |
| 2010/0042929 A1* | 2/2010 | Berry | G06F 9/454 715/738 |
| 2010/0175050 A1* | 7/2010 | Wang | G06F 11/3684 717/124 |
| 2012/0131556 A1* | 5/2012 | Mathur | G06F 11/3664 717/125 |
| 2012/0166476 A1* | 6/2012 | Zaidi | G06F 17/30997 707/769 |

* cited by examiner

*Primary Examiner* — Wei Y Zhen
*Assistant Examiner* — Amir Soltanzadeh
(74) *Attorney, Agent, or Firm* — Finnegan, Henderson, Farabow, Garrett & Dunner, LLP

(57) ABSTRACT

A method and a system are described for generation of test automation scripts in real time. The method includes scanning a plurality of properties associated with objects within a user interface of an application under test. The method includes comparing the properties with a pre-stored object library. The pre-stored object library comprises metadata of pre-stored properties of the application under test. This includes identifying the updated properties associated with one or more objects from the plurality of objects based on the comparison of metadata of updated objects with the metadata of existing or pre-stored properties. This includes creating a unique XPATH reference for each of the one or more of objects based on the identified one or more updated properties. The method includes generating in real time one or more test automation scripts for each of the one or more of objects based on the unique XPATH reference.

13 Claims, 3 Drawing Sheets

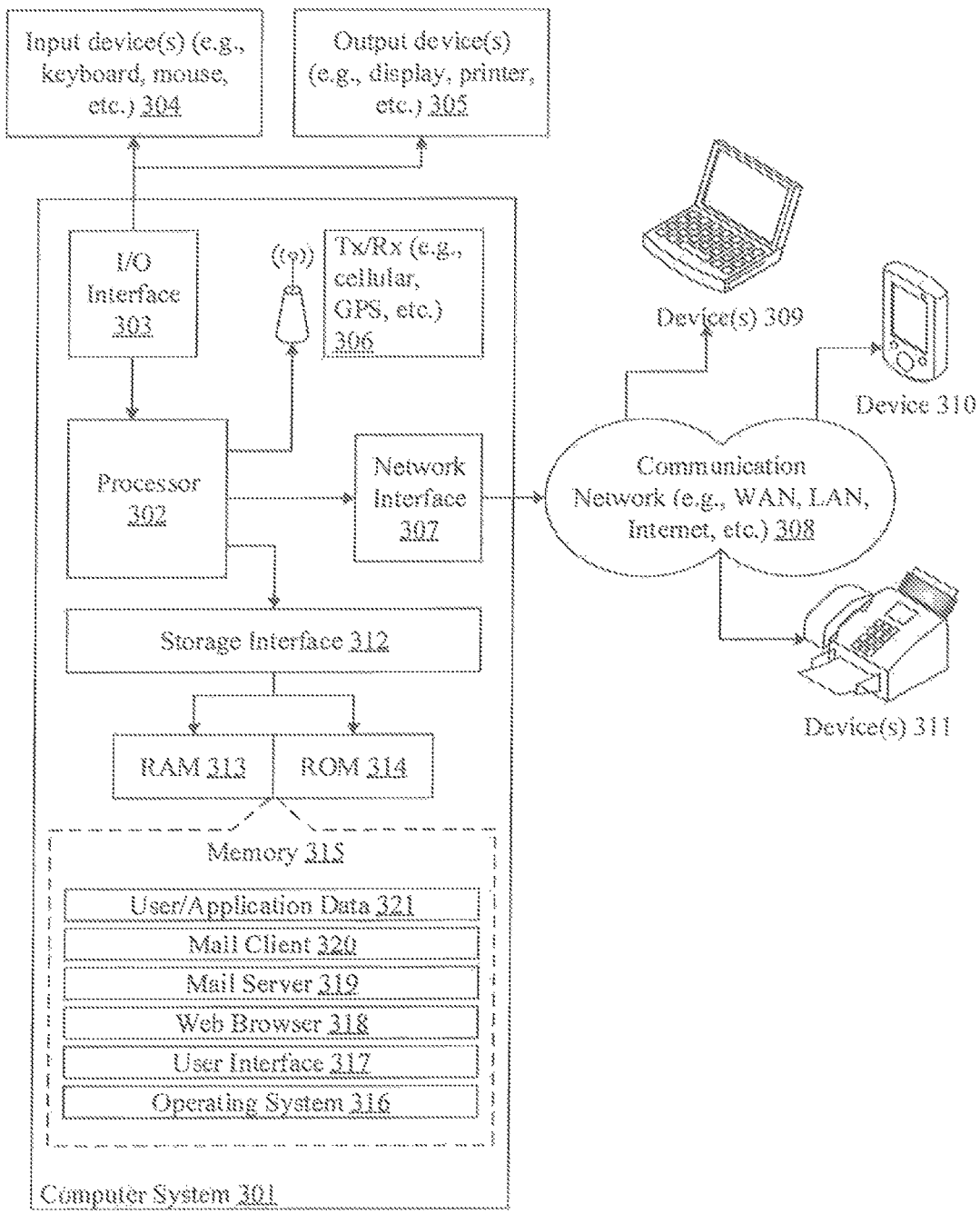
FIG. 3 Example Computer System

US 10,474,560 B2

METHOD AND A SYSTEM FOR GENERATION OF TEST AUTOMATION SCRIPTS IN REAL TIME

TECHNICAL FIELD

The present subject matter is related, in general to generation of test automation scripts, and more particularly, but not exclusively to a method and a system for generation of test automation scripts in real time.

BACKGROUND

Software product testing is a cardinal step in software product making, before release of products in a market. A faster deployment to market, or more specifically to clients, for a positive customer experience requires testing of software applications to be done efficiently and swiftly. An application, during a development stage or even after it is deployed, may undergo a series of changes. So, this requires up to date testing of the new features of the application, by generation of test automation scripts. However, in reality it is not a matter of generating one or two test scripts for testing the new features of an application. The changes in features of an application, may demand generation of hundreds of test automation scripts for subsequent testing. But, if one has to do this manually and test each and every test automation script one by one, shall be time consuming and delay the deployment or update of the product in the market.

Hence, an automated process of testing by generation of test automation scripts and then maintenance of the test automation scripts is an important feature. Better customer experience and faster deployment to market hence requires test automation to play a key role in application testing. Organizations use multitude of test automation tools (e.g. Selenium® testing tool, HP UFT® testing tool, Coded UI® testing tool, Cucumber® testing tool) and custom built automation frameworks to support test automation initiatives at enterprise level. However, organizations are struggling with high maintenance effort for the automated test suite. One of the main reasons for failure of automated test suites is non-recognition of existing controls in application post enhancements.

Typically, test automation tools identify controls in application through unique identification of object stored in object repository which is a technical way to locate an object in the application by navigating through page hierarchy. Moreover, object repository is specific to automation tool chosen for automation. As application undergoes enhancements, properties of controls in application changes and the existing control doesn't get recognized leading to failure of test automation scripts. Automation tester can identify this only after the failure of a test automation script. In order to fix this, the automation tester needs to analyze the failed test script, identify objects which automation test script is unable to locate, capture new properties of the object, update object repository with new identification for the objects and rerun the failed test automation script. But, owing to a huge quantitative numbers of these test automation scripts, it may not be feasible to do manually; increases test cycle time but also results in higher maintenance effort.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

According to embodiments illustrated herein, there may be provided a method for generation of test automation scripts in real time. The method may include scanning each of a plurality of properties associated with each of a plurality of objects within a user interface of an application under test. In an embodiment, the method may include comparing the plurality of properties with a pre-stored object library. In an embodiment, the pre-stored object library may comprise metadata of properties associated with a historical user interface of the application under test. The method may include identifying one or more updated properties associated with one or more objects from the plurality of objects based on the comparison of metadata of the plurality of objects with the metadata of properties associated with a historical user interface. The method may include creating a unique XPATH reference for each of the one or more of objects based on the identified one or more updated properties. The method may include generating in real time one or more test automation scripts for each of the one or more of objects based on the unique XPATH reference.

According to embodiments illustrated herein, there may be provided a test automation system to generate test automation scripts in real time, which includes a processor and a memory communicatively coupled to the processor, wherein the memory stores processor instructions, which, on execution causes generation of automated test scripts in real time. In an embodiment, the processor may be configured to scan each of a plurality of properties associated with each of a plurality of objects within a user interface of an application under test. The processor may be further configured to compare the plurality of properties with a pre-stored object library. In an embodiment, the pre-stored object library may comprise metadata of properties associated with a historical user interface of the application under test. The processor may be further configured to identify one or more updated properties associated with one or more objects from the plurality of objects based on the comparison of metadata of the plurality of objects with the metadata of properties associated with a historical user interface. The processor may be further configured to create a unique XPATH reference for each of the one or more of objects based on the identified one or more updated properties. The processor may be further configured to generate in real time one or more test automation scripts for each of the one or more of objects based on the unique XPATH reference.

According to embodiments illustrated herein, a non-transitory computer-readable storage medium having stored thereon, a set of computer-executable instructions for causing a computer comprising one or more processors to perform steps comprising, scanning each of a plurality of properties associated with each of a plurality of objects within a user interface of an application under test. The one or more processors may be configured to compare the plurality of properties with a pre-stored object library. In an embodiment, the pre-stored object library comprises metadata of properties associated with a historical user interface of the application under test. The one or more processors may be configured to identify one or more updated properties associated with one or more objects from the plurality of objects based on the comparison of metadata of the plurality of objects with the metadata of properties associated with a historical user interface. The one or more processors may be configured to create a unique XPATH reference for each of the one or more of objects based on the identified one or more updated properties. The one or more processors may be configured to generating in real time one or more test automation scripts for each of the one or more of objects based on the unique XPATH reference.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 3 illustrates a block diagram of an exemplary computer system for implementing embodiments consistent with the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the satire embodiment.

Figure 1:
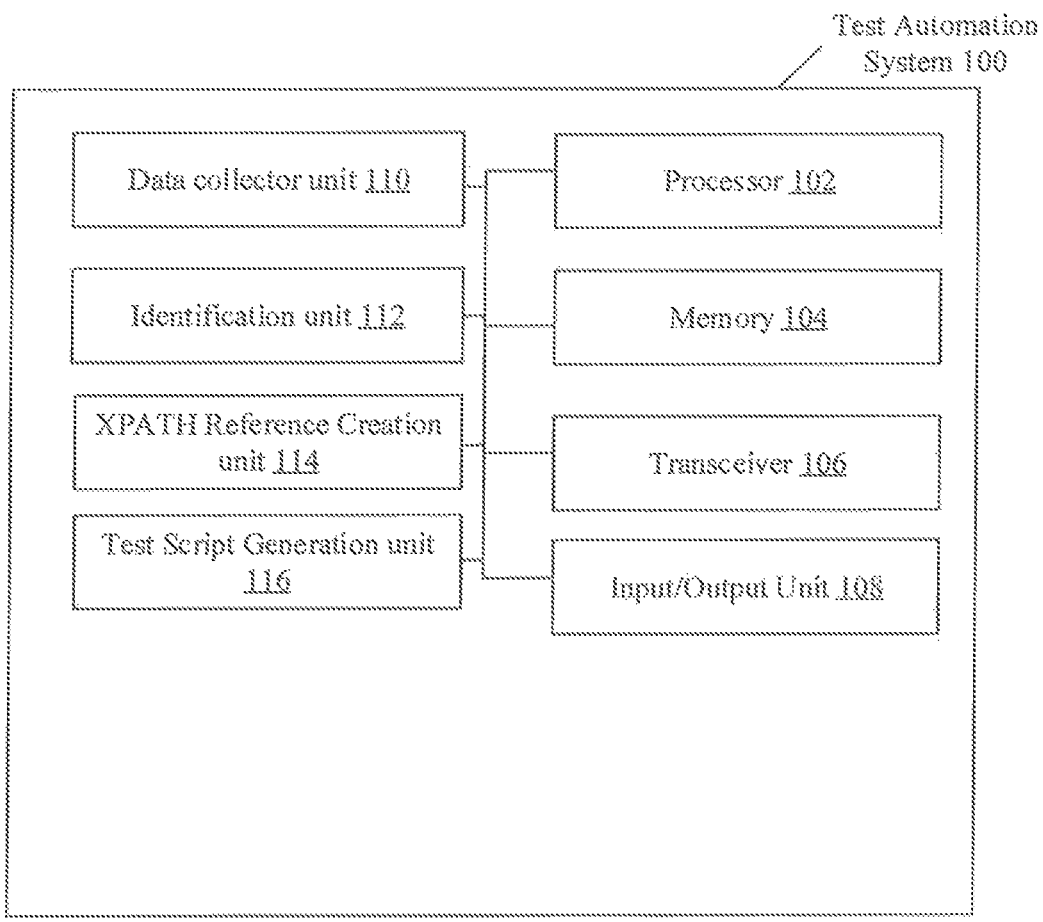
FIG. 1 is a block diagram that illustrates a test automation system configured to automatically generate test automation scripts in real time, in accordance with some embodiments of the present disclosure.

FIG. 1 is a block diagram that illustrates a test automation system configured to automatically generate test automation scripts in real time, in accordance with some embodiments of the present disclosure. The test automation system 100 may include a processor 102, a memory 104, a transceiver 106, an input/output unit 108, a data collection unit 110, an identification unit 112, a XPATH reference creation unit 114, and a test script generation unit 116. The processor 102 may be communicatively coupled to the memory 104, the transceiver 106, and the input/output unit 108, the data collection unit 110, the identification unit 112, the XPATH reference creation unit 114 and the test script generation unit 116.

The processor 102 may include suitable logic, circuitry, interfaces, and/or code that may be configured to execute a set of instructions stored in the memory 104. The processor 102 may be implemented based on a number of processor technologies known in the art. Examples of the processor 102 include, but not limited to, an X86-based processor, a Reduced Instruction Set Competing (RISC) processor, an Application-Specific Integrated Circuit (ASIC) processor, a Complex Instruction Set Computing (CISC) processor, and/or other processor.

The memory 104 may include suitable logic, circuitry, interfaces, and/or code that may be configured to store the set of instructions, which may be executed by the processor 102. In an embodiment, the memory 104 may be configured to store one or more programs, routines, or scripts that may be executed in coordination with the processor 102. The memory 104 may be implemented based on a Random Access Memory (RAM), a Read-Only Memory (ROM), a Hard Disk Drive (HDD), a storage server, and/or a Secure Digital (SD) card.

The transceiver 106 may include of suitable logic, circuitry, interfaces, and/or code that may be configured to receive a request for generation of test automation scripts in real time based on a user input. In an embodiment, the transceiver 106 may be configured to transmit a generated test automation script to the processor 102 for further execution. The transceiver 106 may implement one or more known technologies to support wired or wireless communication with the communication network. In an embodiment, the transceiver 106 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 106 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)

The Input/Output (I/O) unit 108 may include suitable logic, circuitry, interfaces, and/or code that may be configured to receive an input or transmit an output. The input/output unit 108 may include various input and output devices that are configured to communicate with the processor 102. Examples of the input devices include, but are not limited to, a keyboard, a mouse, a joystick, a touch screen, a microphone, and/or a docking station. Examples of the output devices include, but are not limited to, a display screen and/or a speaker.

The data collector unit 110 may include suitable logic, circuitry, interfaces, and/or code that may be configured to obtain a html content of a user interface of an application under test using a web page scraping technique. In an embodiment, the html content may comprise the plurality of objects. The data collector unit 110 may be further configured to scan each of a plurality of properties associated with each of a plurality of objects within the user interface of the application under test. In an embodiment, the data collector unit 110 may be further configured to store the plurality of properties associated with each of the plurality of objects in the pre-stored object library. In an embodiment, the plurality of properties may be stored in an element format.

The identification unit 112 may include suitable logic, circuitry, interfaces, and/or code that may be configured to identify a type of control of each of the plurality of objects based on a pre-defined classification pattern and separate each of the plurality of objects based on the identified type of control. The identification unit 112 may be configured to compare the plurality of properties with a pre-stored object library. In an embodiment, the pre-stored object library may comprise metadata of properties associated with a historical user interface of the application under test. The identification unit 112 may be further configured to utilize a continuous asynchronous rule pattern to compare the metadata of the plurality of objects with the metadata of properties associated with the historical user interface. In an embodiment, the continuous asynchronous rule pattern may be a Boolean attribute that may require a control timing protocol. The identification unit 112 may be configured to identity one or more updated properties associated with one or more objects from the plurality of objects based on the comparison of metadata of the plurality of objects with the metadata of properties associated with a historical user interface.

The XPATH reference creation unit 114 may include suitable logic, circuitry, interfaces, and/or code that may be configured to determine a hierarchy of the plurality of objects in the user interface. The XPATH reference creation unit 114 may be configured to create a temporary table comprising the plurality of properties associated with each of a plurality of objects. The XPATH reference creation unit 114 may be further configured to create the unique XPATH reference for each of the one or more of objects from the plurality of objects based on the hierarchy and the screen position. The XPATH reference creation unit 114 may be further configured to create a unique XPATH reference for each of the one or more of objects based on the identified one or more updated properties. The XPATH reference creation unit 114 may be configured to update the pre-stored object library based on the identified one or more updated properties associated with one or more objects. In an embodiment, the pre-stored object library may be updated with the metadata of the identified one or more objects. The XPATH reference creation unit 114 may be configured to update the pre-stored object library to include the unique XPATH reference for each of the one or more of objects.

The test script generation unit 116 may include suitable logic, circuitry, interfaces, and/or code that may be configured to generate in real time one or more test automation scripts for each of the one or more of objects based on the unique XPATH reference.

In operation, the data collector unit 110 may be configured to obtain the html content of the user interface of the application under test using a web page scraping technique. The web scraping technique may convert the content of a web page (user interface) in a browser into the html content, which in turn is converted into an xml file and later to be converted into a notepad document. In an embodiment, the html content may comprise the plurality of objects. The data collector unit 110 may be an engine running seamlessly to scan the object library of the user interface of the application under test. The html content may nave a plurality of objects and corresponding properties. When a user interface page is opened in a browser, the uniform resource locator (URL) may be passed to the processor 102. The data collector unit 110 may be further configured to scan each of a plurality of properties associated with each of the plurality of objects within the user interface of the application under test.

For example, below is a sample html code, which has the object and its corresponding property.
<li class="menu-item menu-item-type-custom menu-item-object-custom menu-item-9" id="menu-item-9"><a href="http://sess.dedd.com/" target="_blank">Semi_Portal</a></li> In the example, the object may be "menu-item", whereas its corresponding property may be "9". Another object, in the above html code, may be "target" whose corresponding property may be "blank". In another example, an interface may be remote procedure call (RPC) or application program interface (API) or hypertext transmission protocol (HTTP) or open database connectivity (ODBC) calls.

After scanning the plurality of properties associated with each of the plurality of objects, the data collector unit 110 may be configured to the plurality of properties associated with each of the plurality of objects in the pre-stored object library. In an embodiment, the plurality of properties may be stored in an element format.

In an embodiment, the data collector unit 110 may be configured to store the properties associated with a historical user interface of the application under test. In an embodiment, the pre-stored object library comprises metadata of properties associated with a historical user interface of the application under test. Metadata may be understood as a set of data that gives information about other data of its own type. In an embodiment, metadata may maintain a build pattern of the pre-stored object library. Further, the metadata may include the latest version of the pre-stored object library. In an embodiment, the identification unit 112 may act like a bridge between the data collector unit 110 and the XPATH reference creation unit 114, where the identification unit 112 may keep a track of type of the plurality of objects getting inside the XPATH reference creation unit 114. The details of reference creation unit 114 are explained later.

Example of metadata may be as below:
<li class="menu-item menu-item-type-custom menu-item-object-custom menu-item-9" id="menu-item-9">
<a href="http://sess.dedd.com/" target="_blank">Semi_Portal</a></li>

Further, the data collector unit 110 may be configured to store the XPATH and the screen positions of each of the plurality of objects. For example, a current screen position may be 74.68×17. There may be syntax examples that appear throughout a XPATH reference. For example, book [/bookstore/@specialty=@style], refers to <book> elements whose style attribute value is equal to the specialty attribute value of the <bookstore> element at the root of the document.

<book category="cooking">
<title lang="en">Everyday Italian</title>
<author>Giada De Laurentiis</author>
<year>2005</year>
<price>30.00</price>
</book>

A few such examples may help in further understanding. *[@specialty] refers to all elements with the specialty attribute.

Further, the identification unit 112 may be configured to identify a type of control of each of the plurality of objects based on a pre-defined classification pattern. For example, the pre-defined classification patterns may include types of controls such as input control, or action control, or view control and path control. In an embodiment, the identification unit 112 may follow a structure and pattern that utilizes the stored XPATH of the plurality of objects for identifying the type of control. The following example may illustrate the identification of the type of control.

<input type="text" id=txt1>: this may be treated as input control, where the user may post data through this control.
<input type="button" id="btn1">: this may be treated as action control, where user may perform a submit or action on the UI
<aspx:gridview> this may be treated as view controls, where user may view data via this control
<table><tr><td><span><div>, Such html tags may be treated as path controls.

After identification of the type of control, the identification unit 112 may be configured to separate each of the plurality of objects based on the identified type of control.

The separated objects may be identified using the EPWOLF technique (Exact Position With Object Locator and Finder). This technique may be employed to validate the position of the objects created. For example, the below table comprises a set of objects placed in a hierarchy.

"html, body, div, span, applet, object, iframe, h1, h2, h3, h4, h5, h6, div.h1, div.h2, div.h3, div.h4, div.h5, div.h6, p, blockquote, pre, a, abbr, acronym, address, big, cite, code, del, dfn, em, img, ins, kbd, q, s, samp, small, strike, strong, tt, var, b, u, i, dl, dt, dd, ol, nav ul, nav li, fieldset, form, label, legend, table, caption, tbody, tfoot, thead, tr, th, td, article, aside, canvas, details, embed, figure, figcaption, footer, header, hgroup, menu, nav, output, ruby, section, summary, time, mark, audio, video". The EPWOLF technique may now be employed to validate position of each object. A path may be created by the help of the identification unit 112 and it may be inserted into a screen position. If the control changes, the screen location of the control with path may remain the same. It may be then easy to work with the XPATH reference creation unit 114 to understand and identify the key differences and a new expression may be inserted with key position.

After separation, the identification unit 112 may be configured to compare the plurality of properties with the pre-stored object library. In an embodiment, the pre-stored object library may comprise the metadata of properties associated with the historical user interface of the application under test. Thus, the metadata of the historical user interface and the metadata of the user interface may be compared.

For example:
<li class="menu-item menu-item-type-custom menu-item-object-custom menu-item-9" id="menu-item-9"><a href="http://sess.dedd.com/" target="_blank">Semi Portal</a></li>
is an example of metadata which can build a table. The table may look like:
html, body, div, span, applet, object, iframe, h1, h2, h3, h4, h5, h6, div.h1, div.h2, div.h3, div.h4, div.h5, div.h6, p, blockquote, pre, a, abbr, acronym, address, big, cite, code, del, dfn, em, img, ins, kbd, q, s, samp, small, strike, strong, tt, var, b, u, i, dl, dt, dd, ol, nav ul, nav li, fieldset, form, label, legend, table, caption, tbody, tfoot, thead, tr, th, td. This may be considered as the historical user interface, or the existing features. Now the present embodiment, may add a few more objects. For example, "article, aside, canvas, details, embed, figure, figcaption, footer, header, hgroup, menu, nav, output, ruby, section, summary, time, mark, audio, video . . . " and the new table along with the new properties of the objects may look like,
h1, h2, h3, h4, h5, h6, div.h1, div.h2, div.h3, div.h4, div.h5, div.h6, p, blockquote, pre, a, abbr, acronym, address, big, cite, code, del, dfn, em, img, ins, kbd, q, s, samp, small, strike, strong, tt, var, b, u, i, dl, dt, dd, ol, nav ul, nav li, fieldset, form, label, legend, table, caption, tbody, tfoot, thead, tr, th, td, article, aside, canvas, details, embed, figure, figcaption, footer, header, hgroup, menu, nav, output, ruby, section, summary, time, mark, audio, video.

The above example discloses how the identification unit 112 may compare the plurality of properties with the pre-stored object library with the new properties.

After comparison of the plurality of properties with the pre-stored object library, the identification unit 112 may identify one or more updated properties associated with one or more objects from the plurality of objects based on the comparison of metadata of the plurality of objects with the metadata of properties associated with the historical user interface.

For example, if there may be new controls in the user interface as compared to the historical user interface, the identification unit 112 may compare the properties of the plurality of objects and identify that there are new controls (one or more objects) in the user interface. In an embodiment, one or more properties of objects within the historical user interface may be updated and such objects may also be considered as the one or more objects whose who have one or more updated properties. In an embodiment, such one or more objects may be identified based on a comparison of the metadata of the objects in the historical user interface with the metadata of the objects in the user interface. The new controls in the user interface may be compared, to check whether, they are same, or if the new controls are non-existing in the metadata.

The identification unit 112 may read out the objects of a current page and take it into the data table of the metadata. The identification unit 112 may be further configured to take note of the new changes made in the table/database. In an embodiment, the identifying of the one or more updated properties may further include utilizing a continuous asynchronous rule pattern to compare the metadata of the plurality of objects with the metadata of properties associated with the historical user interface. In an embodiment, the continuous asynchronous rule pattern is a Boolean attribute that requires a control timing protocol. For example, if there are new controls, the pre-stored object library stored in the metadata which is a cache layer of storage module. The new controls may be compared to verify of they are the same existing controls.

In an embodiment, the storage module (not shown) in the identification unit 112 may assemble and make the data storage in a nonlinear fashion for all the plurality of objects of the user interface in the application under test. This may be stored as a library of controls. In an embodiment, the metadata may retrieve a plurality of data stored in the Storage Module. When data is required which may not present in the metadata/pre-stored object library, it may connect to the Storage module to fetch the data.

After identifying the one or more updated properties, the XPATH reference creation unit 114 may determine a hierarchy of the plurality of objects in the user interface. The one or more object creation request may be received by the processor 102 and the request may be positioned first in the stack of elements to determine the hierarchy. Such a request may determine the hierarchy of the plurality of objects in the user interface. Further, in order to determine the hierarchy, the XPATH reference creation unit 114 may create a temporary table comprising the plurality of properties associated with each of the plurality of objects. In an embodiment, the complete hierarchy of the plurality of objects may be represented in the temporary table. For example, <li class="menu-item menu-item-type-custom menu-item-object-custom menu-item-9" id="menu-item-9">
<a href="http://sess.dedd.com/" target="_blank">Semi_Portal</a></li>

In the above example, metadata may build the table and a current screen location may look like 74.68*17 and the table may look like,
html, body, div, span, applet, object, iframe, h1, h2, h3, h4, h5, h6, div.h1, div.h2, div.h3, div.h4, div.h5, div.h6, p, blockquote, pre, a, abbr, acronym, address, big, cite, code, del, dfn, em, img, ins, kbd, q, s, samp, small, strike, strong, tt, var, b, u, i, dl, dt, dd, ol, nav ul, nav li, fieldset, form, label, legend, table, caption, tbody, tfoot, thead, tr, th, td, article, aside, canvas, details, embed, figure, figcaption, footer, header, hgroup, menu, nav, output, ruby, section, summary, time, mark, audio, video, where 74.68*17 may be the current screen location for an object.

The plurality of objects may exhibit various statistics like division, table to which the object belongs and a html tag. Based on the statistics of the plurality of objects later the XPATH reference creation unit 114 may set a flag as 'I' and pass a control request for object position validation, where the flag "I" may stand as inherited. Hence, the request may be interpreted for the object position validation, to locate the exact location of the plurality of objects. In an embodiment, the XPATH reference creation unit 114 may use the complete resolution of the screen 1920×780 and locate the X-Y coordinates of the plurality of objects. Thus, based on the determined hierarchy, the XPATH reference creation unit 114 may identify a screen position of each of the plurality of objects. In an embodiment, the screen position may correspond to X-Y coordinates of each of the plurality of objects.

In an embodiment, the XPATH reference creation unit 114 may generate the XPATH for the plurality of objects by picking an expression, that is a key working model which generates XPATH in a unique manner. This may be called as a detect to direct (DTD) technique. The DTD technique may generate the unique XPATH reference and may in locating the X-Y co-ordinates of the plurality of objects and also it generates the hierarchy of XPATH. For example, DTD may work with a three tabular format.

Tabular_1: this will get the exact x, y location of the control
Tabular_2: Finalizes the XPATH with hierarchy
Tabular_3: Makes an expression ready with Tabular_1+ Tabular_2

Based on the determined hierarchy and the screen position, the XPATH reference creation unit 114 may create a unique XPATH reference for each of the one or more objects from the plurality of objects. A XPATH reference is a major element in an Extensible Stylesheet Language Transformations (XSLT) standard. It is a syntax for defining parts of an XML document and uses path expressions to navigate in XML documents. XPATH contains a library of standard functions and is a major element in XSLT and in XQuery.

Thus, the XPATH reference creation unit 114 may generate a unique reference for the one or more objects based on the object properties and consequently update the objects and the object properties in the metadata of the pre-stored object library. In an embodiment, the flag may not be set as "G" and it may be passed to XPATH reference unit 114, which may integrate both the steps. In the embodiment, "G" stands for Generation Ready XPATH generator. The Generation Ready XPATH generator may now take the input of hierarchy and screen position of the control.

For example:

<table>
<tr>
<td>
<input type = "button" position="60,40">

In the above example the XPATH reference creation unit 114 may pick a path from identification unit 112 and may validate the position of the one or more objects on the screen. This may generate a unique path combination. A full expression may look like, Full expression=(Path1{Table}+Path2{*tr*}+ Path3{*td*}+Action1{button}+Screen Position{*x, y*}

For each of the plurality of objects, the above loop may be repeated and the objects may be collected one by one. This may make a complete set of table with a new control name, type, and the unique XPATH reference of the plurality of objects. Before the details of the new controls (one or more objects) may be passed to the test script generation unit 116 (explained below) may run a pre-determined function to insert the newly identified objects (one or more objects) inside the pre-stored object library. When the pre-stored object library is refreshed there may be an asynchronous call. This may happen from the metadata to the storage module which may keep colleting a recent addition happened to the metadata. This may update the metadata which may help in comparing the controls.

The XPATH reference creation unit 114 may be further configured to update the pre-stored object library based on the identified one or more updated properties associated with one or more objects. In an embodiment, the pre-stored object library may be updated with the metadata of the identified one or more objects. The XPATH reference creation unit 114 may further update the pre-stored object library to include the unique XPATH reference for each of the one or more of objects.

After generation of the unique XPATH reference, the test script generation unit 116 may generate in real time one or more test automation scripts for each of the one or more objects based on the unique XPATH reference. In an embodiment, the pre-stored object library may be updated and the pre-stored object library may provide the completed unique XPATH to the test script reference unit 116. Once the user selects a tool that may be QTP or SELENIUM, but not restricted to it, the test script generation unit 116 may prepare a script with the respective the unique XPATH reference for the new control (one or more objects) generated. If a webpage has more than one new control, then all the newly generated unique XPATH references may be sent to the test script generation unit 116, and it may take input from a tool. In accordance with the selection of a tool, the test script generation unit 116 may prepare the test automation script and may also add script for assertions. The test script generation unit 116 may have the preloaded keyword with the existing script modules. For example, If the user selects the TargetTool as QTP:
Then the below script will be generated by the tool and it will be placed inside the current script.
For example, XPATHlist="//listfile"
Set fso=createobject("scripting.filesystemobject")
If fso.FileExists(filepath)true Then
  'reporter.ReportEvent micFail,"specified file does not exist","'

Figure 2:
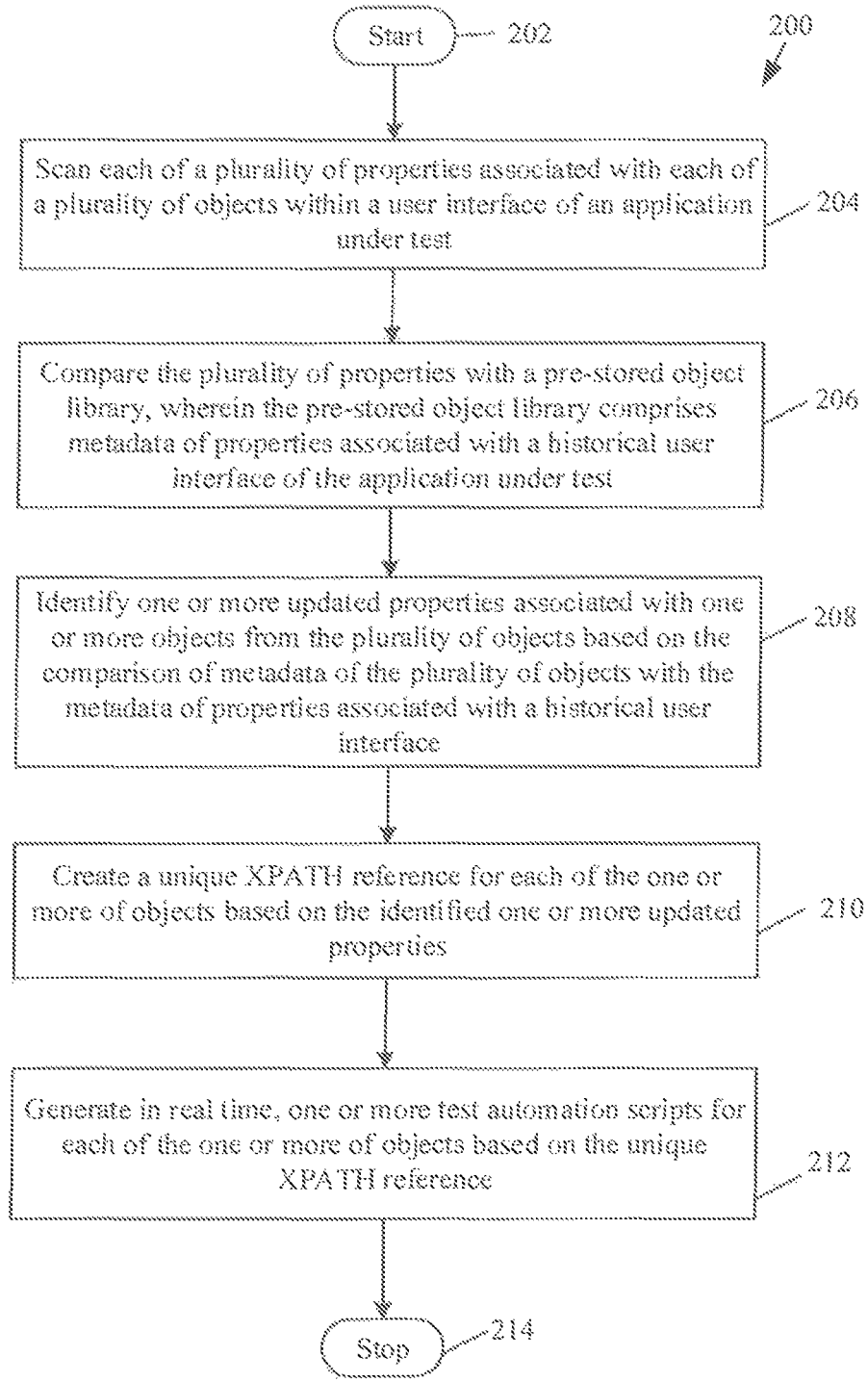
FIG. 2 is a flowchart illustrating a method for generation of test automation scripts in real time, in accordance with some embodiments of the present disclosure.

FIG. 2 is a flowchart 200 illustrating a method for generation of test automation scripts in real time, in accordance with some embodiments of the present disclosure. The method starts at step 202 and proceeds to step 204.

At step 204, the test automation system 100, may scan each of a plurality of properties associated with each of a plurality of objects within a user interface of an application under test. At step 206, the test automation system 100, may compare the plurality of properties with a pre-stored object library. In an embodiment, the pre-stored object library comprises metadata of properties associated with a historical user interface of the application under test. At step 208, the test automation system, may identity one or more updated properties associated with one or more objects from the plurality of objects based on the comparison of metadata of the plurality of objects with the metadata of properties associated with a historical user interface. At step 210, the test automation system, may create a unique XPATH reference for each of the one or more of objects based on the identified one or more updated properties. At step 212, the test automation system, may generate in real time, one or more test automation scripts for each of the one or more of objects based on the unique XPATH reference. Control passes to end step 214.

Computer System

FIG. 3 illustrates a block diagram of an exemplary computer system for implementing embodiments consistent with the present disclosure. Variations of a computer system 301 may be used for performing generation of test automation scripts in real time. The computer system 301 may comprise a central processing unit ("CPU" or "processor") 302. Processor 302 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 302 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 302 may be disposed in communication with one or more input/output (I/O) devices via I/O interface 303. The I/O interface 303 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Processor 302 may be disposed in communication with one or more input/output (I/O) devices via an I/O interface 303. I/O interface 303 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 303, computer system 301 may communicate with one or more I/O devices. For example, an input device 304 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 305 may be a printer, fax machine, video display (e.g., cathode ray tube (CRT), liquid crystal display (LCD), light-emitting diode (LED), plasma, or the like), audio speaker, etc. In some embodiments, a transceiver 306 may be disposed in connection with processor 302. The transceiver may facilitate various types of wireless transmission or reception. For example, transceiver may include an antenna operatively connected to a transceiver chip (e.g., TEXAS® INSTRUMENTS WILINK WL1283® transceiver, BROADCOM® BCM4550IUB8® transceiver, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, processor 302 may be disposed in communication with a communication network 308 via a network interface 307. Network interface 307 may communicate with communication network 308. Network interface 307 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. The Communication network 308 may include, without limitation, a direct interconnection, local area network (LAN), wide area network (WAN), wireless network (e.g., using Wireless Application Protocol), the Internet, etc. Using network interface 307 and communication network 308 computer system 301 may communicate with devices 309, 310, and 311. These devices may include, without limitation, personal computer(s), served(s), tax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 301 may itself embody one or more of these devices.

In some embodiments, processor 302 may be disposed in communication with one or more memory devices (e.g., RAM 313, ROM 314, etc.) via a storage interface 312. The storage interface may connect to memory including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 316, user interface application 317, web browser 318, mail server 319, mail client 320, user/application data 321 (e.g., any data variables or data records discussed in this disclosure), etc. The operating system 316 may facilitate resource management and operation of the computer system 301. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 317 may facilitate display, execution, interaction, manipulation, or operation of program components through textual or graphical facilities. For example, user interfaces may provide computer interaction interface elements on a display system operatively connected to the computer system 301, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 301 may implement a web browser 318 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 301 may implement a mail server 319 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 301 may implement a mail client 320 stored program component. The mail client may be a mail viewing application, such as Apple Mail, Microsoft Entourage, Microsoft Outlook, Mozilla Thunderbird, etc.

In some embodiments, computer system 301 may store user/application data 321, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments provide method and system for generation of test automation scripts in real time. The generation of test automation scripts proposes a major disruption in the way application changes am handled in a test automation suite irrespective of the type of application, automation tool used and automation framework. The objective is to introduce automated generation and continuous maintenance feature in a new test automation suite by which any technical changes introduced in application can be automatically detected and fixed in test automation suite so that the test automation suite may continue to run uninterruptedly when a new application is being built.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media. It is intended that the disclosure and examples be considered as exemplary only, with a true scope and spirit of disclosed embodiments being indicated by the following claims.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise. The terms "including", "comprising", "having" and variations thereof mean "including but not limited to", unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

Finally, the language used in the specification has been principally selected for readability and instructional purposes, and it may not have been selected, to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

We claim:

1. A method for generation of test automation scripts in real time, the method comprising:
   scanning, by a test automation system, each of a plurality of properties associated with each of a plurality of objects within a user interface of an application under test;
   comparing, by the test automation system, the plurality of properties with a pre-stored object library, wherein the pre-stored object library comprises metadata of properties associated with a historical user interface of the application under test;
   identifying, by the test automation system, one or more updated properties associated with one or more objects from the plurality of objects based on the comparison of metadata of the plurality of objects with the metadata of properties associated with the historical user interface;
   determining, by the test automation system, a hierarchy of the plurality of objects in the user interface based on the updated properties;
   validating, by the test automation system, a screen position of each of the plurality of objects based on the hierarchy, wherein validating the screen position comprises locating X-Y co-ordinates of each of the plurality of objects;
   identifying, by the test automation system, a type of control for each of the plurality of objects based on a pre-defined classification pattern, wherein the pre-defined classification pattern comprises at least one of input control, action control, view control, or path control;
   creating, by the test automation system, a unique XPATH reference for each of the one or more objects from the plurality of objects based on the determined hierarchy, the screen position, and the type of control, wherein the unique XPATH reference indicates changes made to the type of control associated with each of the plurality of objects; and
   generating in real time, by the test automation system, one or more test automation scripts for the changes made to the type of control for each of the one or more objects based on the unique XPATH reference.

2. The method of claim 1, wherein scanning further comprises:
   obtaining html content of the user interface of the application under test using a web page scraping technique, wherein the html content comprises the plurality of objects; and
   storing the plurality of properties associated with each of the plurality of objects in the pre-stored object library, wherein the plurality of properties is stored in an element format.

3. The method of claim 1, further comprising separating each of the plurality of objects based on the identified type of control.

4. The method of claim 1, wherein identifying the one or more updated properties further comprises utilizing a continuous asynchronous rule pattern to compare the metadata of the plurality of objects with the metadata of properties associated with the historical user interface, wherein the continuous asynchronous rule pattern is a Boolean attribute that requires a control timing protocol.

5. The method of claim 1, further comprising updating the pre-stored object library based on the identified one or more updated properties associated with one or more objects, wherein the pre-stored object library is updated with the metadata of the identified one or more objects.

6. The method of claim 1, wherein creating the unique XPATH reference further comprises:
   creating a temporary table comprising the plurality of properties associated with each of the plurality of objects; and
   updating the pre-stored object library to include the unique XPATH reference for each of the one or more objects of the plurality of objects.

7. A test automation system to generate test automation scripts in real time, the test automation system comprising:
   a processor; and
   a memory communicatively coupled to the processor, wherein the memory stores processor instructions, which, on execution, causes the processor to:
      scan each of a plurality of properties associated with each of a plurality of objects within a user interface of an application under test;
      compare the plurality of properties with a pre-stored object library, wherein the pre-stored object library comprises metadata of properties associated with a historical user interface of the application under test;
      identify one or more updated properties associated with one or more objects from the plurality of objects based on the comparison of metadata of the plurality of objects with the metadata of properties associated with the historical user interface;
      determine a hierarchy of the plurality of objects in the user interface based on the updated properties;
      validate a screen position of each of the plurality of objects based on the hierarchy, wherein validating the screen position comprises locating X-Y co-ordinates of each of the plurality of objects;
      identify a type of control for each of the plurality of objects based on a pre-defined classification pattern, wherein the pre-defined classification pattern comprises at least one of input control, action control, view control, or path control;
      create a unique XPATH reference for each of the one or more objects of the plurality of objects based on the determined hierarchy, the screen position, and the type of control, wherein the unique XPATH reference indicates changes made to the type of control associated with each of the plurality of objects; and
      generate in real time one or more test automation scripts for the changes made to the type of control for each of the one or more objects based on the unique XPATH reference.

8. The test automation system of claim 7, wherein scanning further comprises:
   obtaining html content of the user interface of the application under test using a web page scraping technique, wherein the html content comprises the plurality of objects; and
   storing the plurality of properties associated with each of the plurality of objects in the pre-stored object library, wherein the plurality of properties is stored in an element format.

9. The test automation system of claim 7, wherein the processor is further configured to separate each of the plurality of objects based on the identified type of control.

10. The test automation system of claim 7, wherein identifying further comprises utilizing a continuous asynchronous rule pattern to compare the metadata of the plurality of objects with the metadata of properties associated with the historical user interface, wherein the continuous asynchronous rule pattern is a Boolean attribute that requires a control timing protocol.

11. The test automation system of claim 7, wherein the processor is further configured to update the pre-stored object library based on the identified one or more updated properties associated with one or more objects, wherein the pre-stored object library is updated with the metadata of the identified one or more objects.

12. The test automation system of claim 7, wherein creating the unique XPATH reference further comprises:
   creating a temporary table comprising the plurality of properties associated with each of a plurality of objects; and
   updating the pre-stored object library to include the unique XPATH reference for each of the one or more objects of the plurality of objects.

13. A non-transitory computer-readable storage medium having stored thereon, a set of computer-executable instructions for causing a computer comprising one or more processors to perform steps comprising:
   scanning each of a plurality of properties associated with each of a plurality of objects within a user interface of an application under test;
   comparing the plurality of properties with a pre-stored object library, wherein the pre-stored object library comprises metadata of properties associated with a historical user interface of the application under test;
   identifying one or more updated properties associated with one or more objects from the plurality of objects based on the comparison of metadata of the plurality of objects with the metadata of properties associated with the historical user interface;
   determining, by the test automation system, a hierarchy of the plurality of objects in the user interface based on the updated properties;
   validating, by the test automation system, a screen position of each of the plurality of objects based on the hierarchy, wherein validating the screen position comprises locating X-Y co-ordinates of each of the plurality of objects;
   identifying, by the test automation system, a type of control for each of the plurality of objects based on a pre-defined classification pattern, wherein the pre-defined classification pattern comprises at least one of input control, action control, view control, or path control;
   creating a unique XPATH reference for each of the one or more objects of the plurality of objects based on the determined hierarchy, the screen position, and the type of control, wherein the unique XPATH reference indicates changes made to the type of control associated with each of the plurality of objects; and generating in real time one or more test automation scripts for the changes made to the type of control for each of the one or more objects based on the unique XPATH reference.

\* \* \* \* \*